United States Patent
Yang et al.

(10) Patent No.: US 7,369,769 B2
(45) Date of Patent: May 6, 2008

(54) ETHERNET PASSIVE OPTICAL NETWORK RING AND ITS METHOD OF AUTHORIZATION AND COLLISION DETECTION

(75) Inventors: Tzu-Jian Yang, Hsinchu (TW); Kuan-Ming Lin, Hsinchu (TW); Yen-Pin Tseng, Hsinchu (TW); Ja-Nan Wang, Hsinchu (TW); Jeffrey Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 587 days.

(21) Appl. No.: 10/786,036

(22) Filed: Feb. 26, 2004

(65) Prior Publication Data
US 2005/0088964 A1 Apr. 28, 2005

(30) Foreign Application Priority Data
Oct. 28, 2003 (TW) .............................. 92129937 A (51) Int. Cl.
*H04B 10/20* (2006.01)

(52) U.S. Cl. .............................. 398/59; 398/66; 398/67; 398/68; 398/69; 398/70; 398/71; 398/72; 398/79; 398/82; 398/83; 398/98; 398/99; 398/100; 398/33; 398/36; 398/1; 398/2; 398/3; 398/4; 398/5; 398/7; 398/75; 370/216; 370/222; 370/223; 370/225; 370/228; 370/465; 370/445; 370/395.52; 370/395.53; 370/395.4; 370/463; 370/392; 370/401; 370/425; 385/24; 385/37; 385/27; 385/15

(58) Field of Classification Search .................. 398/59, 398/66, 67, 68, 70, 71, 72, 79, 82, 83, 89, 398/98, 100, 99, 36, 4, 75, 3, 1, 7, 33, 69, 398/5, 2; 385/24, 37, 27, 15; 370/216, 222, 370/223, 225, 228, 445, 465, 401, 395.52, 370/395.53, 4.25, 392, 463, 395.4
See application file for complete search history.

(56) References Cited

U.S. PATENT DOCUMENTS

| 6,327,400 | B1 | 12/2001 | Harstead et al. |
| 6,351,582 | B1 * | 2/2002 | Dyke et al. ................... 385/24 |
| 6,414,768 | B1 * | 7/2002 | Sakata et al. ................. 398/59 |

* cited by examiner

*Primary Examiner*—Hanh Phan
(74) *Attorney, Agent, or Firm*—Birch, Stewart, Kolasch & Birch, LLP (57) ABSTRACT

An Ethernet passive optical network (EPON) ring for providing protection against fiber failures. The optical network unit (ONU) is coupled to the ring fiber by a three-port passive optical splitting module that has three two-way optical passages. By the three two-way optical passages, the OUN receives/transmits data from/to the two ends of the optical line termination (OLT) to provide protection while the fiber failure. Moreover, it provides better authorization of users and simpler collision detection by the two-way transmission of the three-port passive optical splitting module to prevent hackers from invading and to reduce collisions.

18 Claims, 12 Drawing Sheets

ETHERNET PASSIVE OPTICAL NETWORK RING AND ITS METHOD OF AUTHORIZATION AND COLLISION DETECTION

This Non-provisional application claims priority under 35 U.S.C. §119(a) on Patent Application No(s). 092129937 filed in Taiwan on Oct. 28, 2003, the entire contents of which are hereby incorporated by reference.

BACKGROUND OF THE INVENTION

1. Field of Invention

The invention relates to an Ethernet passive optical network ring used in a local optical network system. In particular, the invention relates to an Ethernet passive optical network ring that can prevent the whole system from breaking when the network ring fails without the need of additional active or passive optical devices in any form.

2. Related Art

Figure 1:
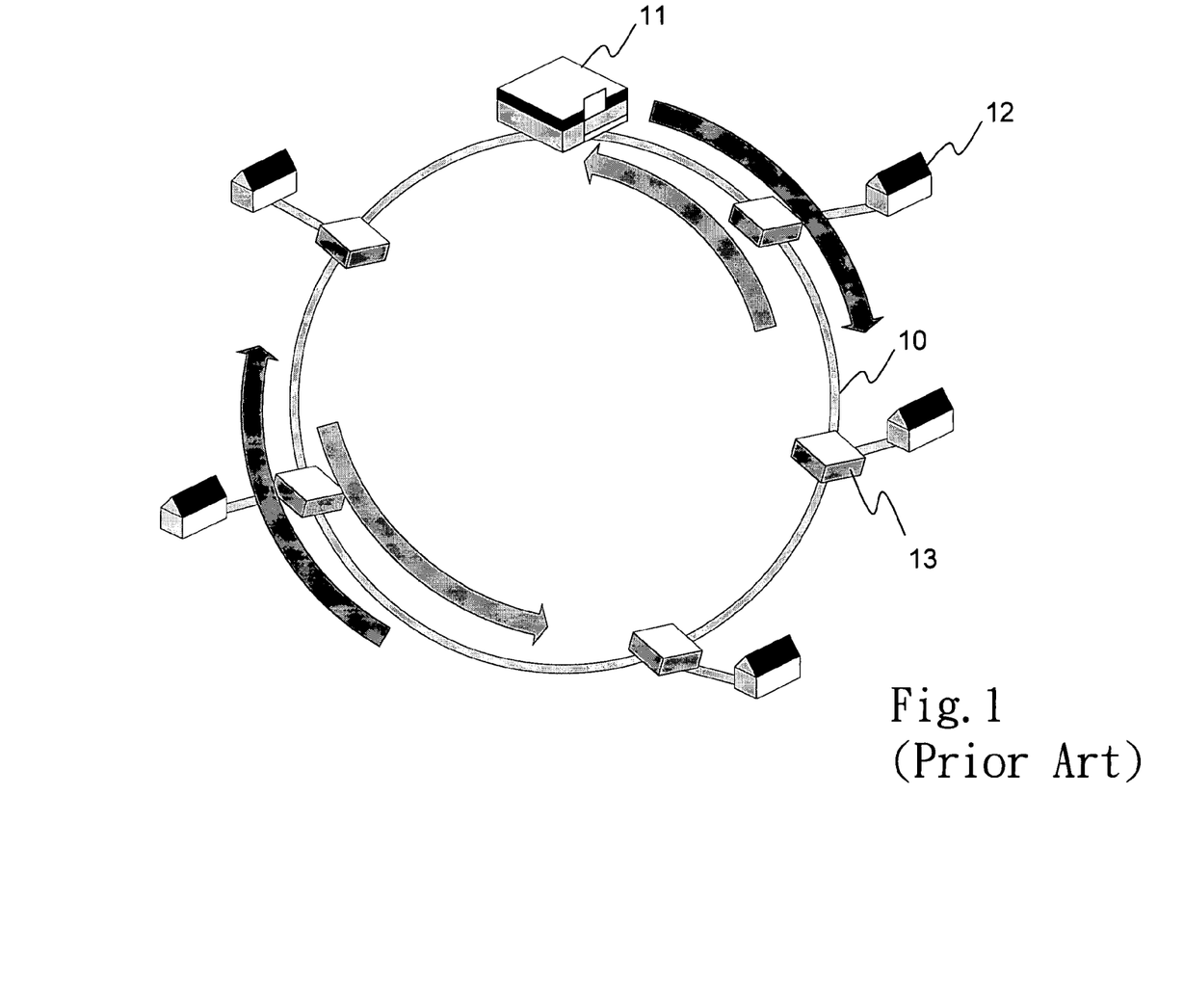
FIG. 1 is a schematic view of a conventional Ethernet passive optical network ring.

The structure of a normal Ethernet passive optical network (EPON) ring is shown in FIG. 1. It uses an optical line termination (OLT) 11 to manage several optical network units (ONU) 12. The two ends of an optical ring 10 are connected to the OLT 11. Each of the ONU 12 uses an optical splitter 13 to connect to the optical ring 10. Therefore, controlled by the OLT 11, they can receive/transmit data. Such an optical network structure is usually suitable for systems with low-density users.

Figures 2A, 2B:
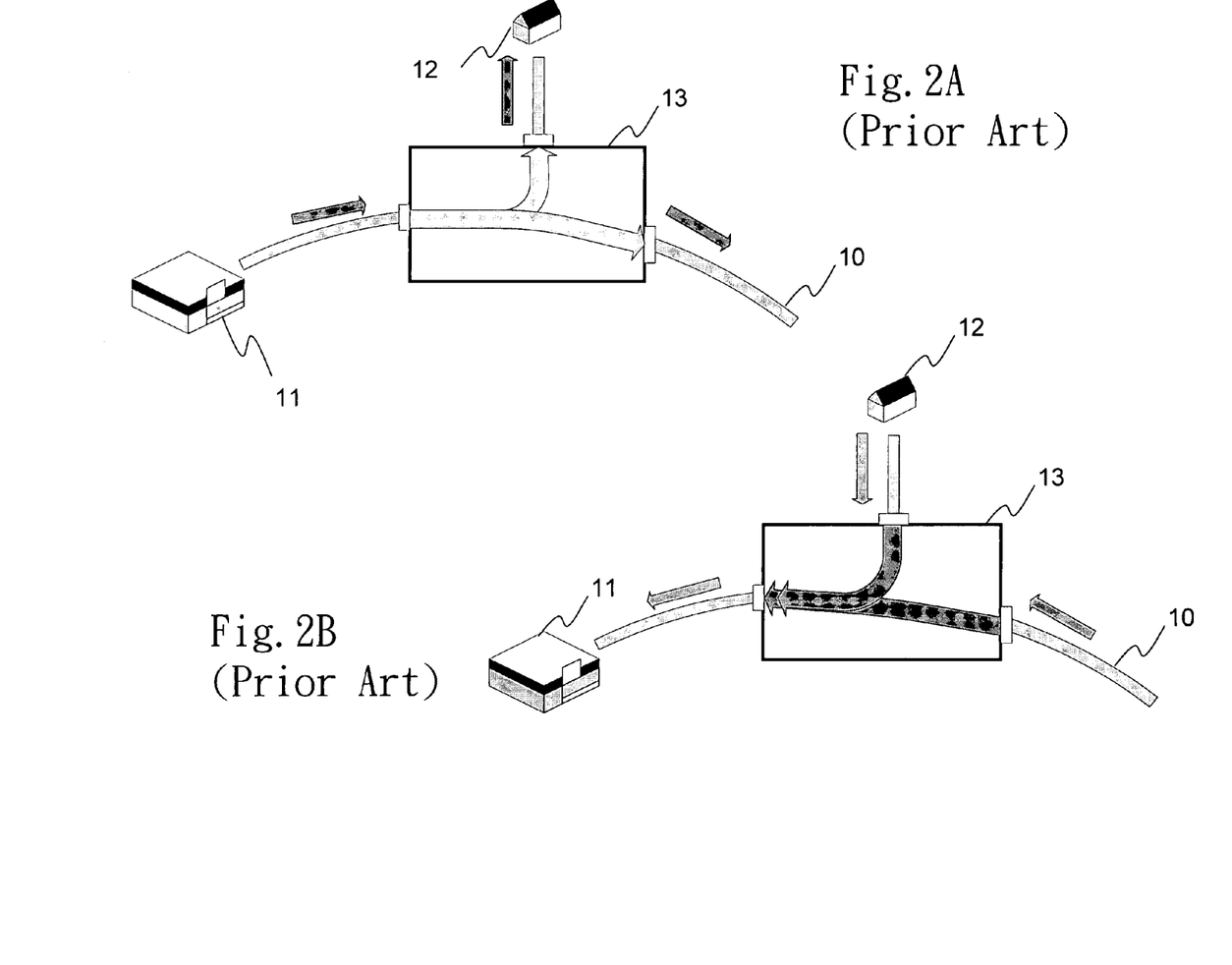
FIGS. 2A and 2B are schematic views of the passages of conventional optical splitters.
Figure 3:
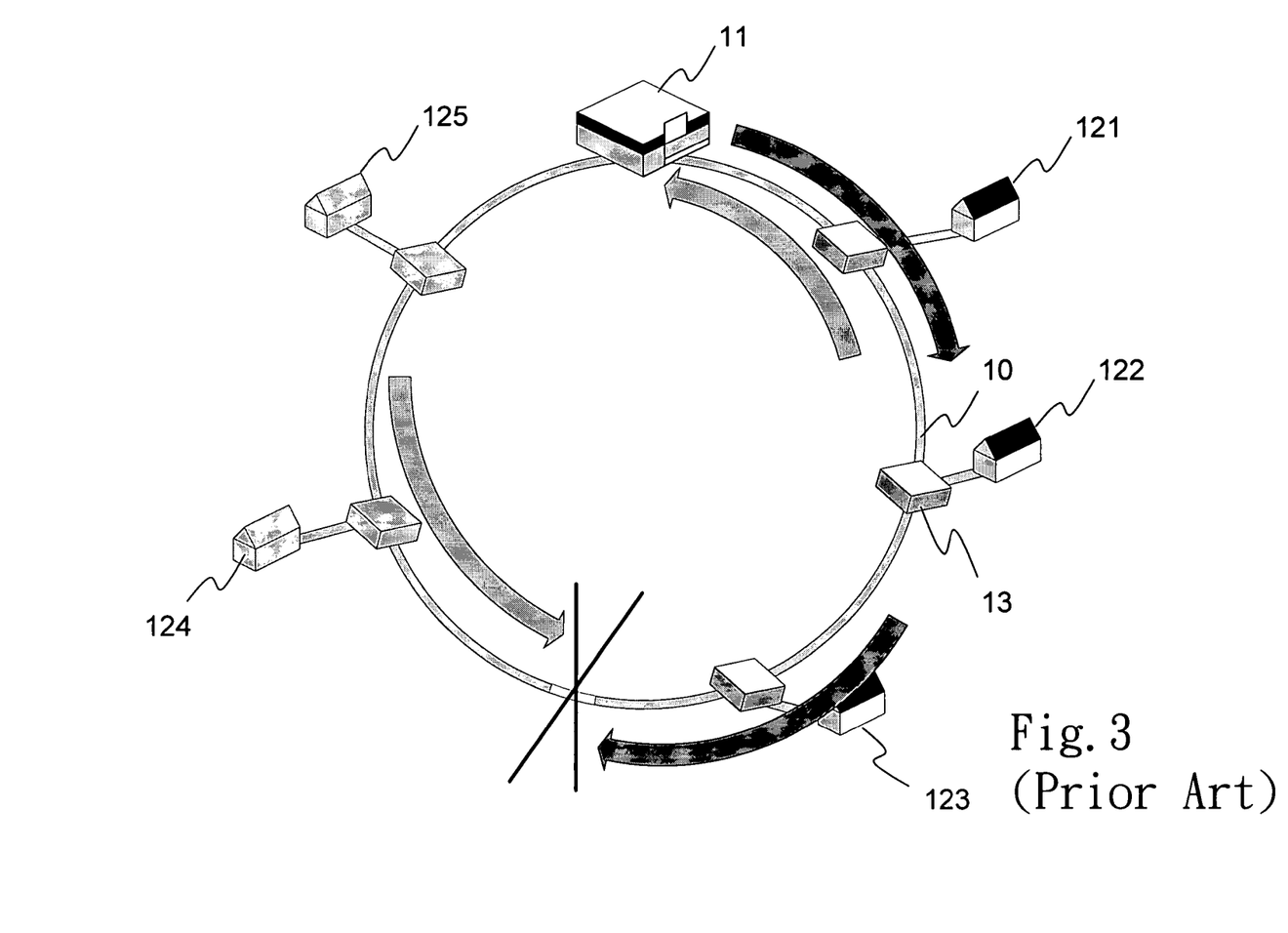
FIG. 3 is a schematic view of a broken conventional Ethernet passive optical network ring.

Due to intrinsic defects, the system breaks as the optical ring 10 fails. With reference to FIGS. 2A and 2B, the optical splitter 13 only provides one-way transmissions for the ONU 12. In other words, the OLT 11 can transmit data only in the clockwise direction along the optical ring 10 (see the arrows shown in FIGS. 1 and 2A), and receive data in the counterclockwise direction along the optical ring 10 (see the arrows shown in FIGS. 1 and 2B). Therefore, once the optical ring 10 breaks, as shown in FIG. 3, the downstream ONU also breaks. The drawing shows in order the first ONU 121, the second ONU 122, the third ONU 123, the fourth ONU 124, and the fifth ONU 125. When the optical ring 10 breaks between the third ONU 123 and the fourth ONU 124, both the fourth ONU 124 and fifth ONU 125 break.

To solve this problem, the U.S. Pat. No. 6,327,400 proposed a switching method to let the optical splitter couple to one end. When the network breaks, it provides a temporary solution. However, the switching method increases device costs and involves higher complexity in controls.

Figure 4:
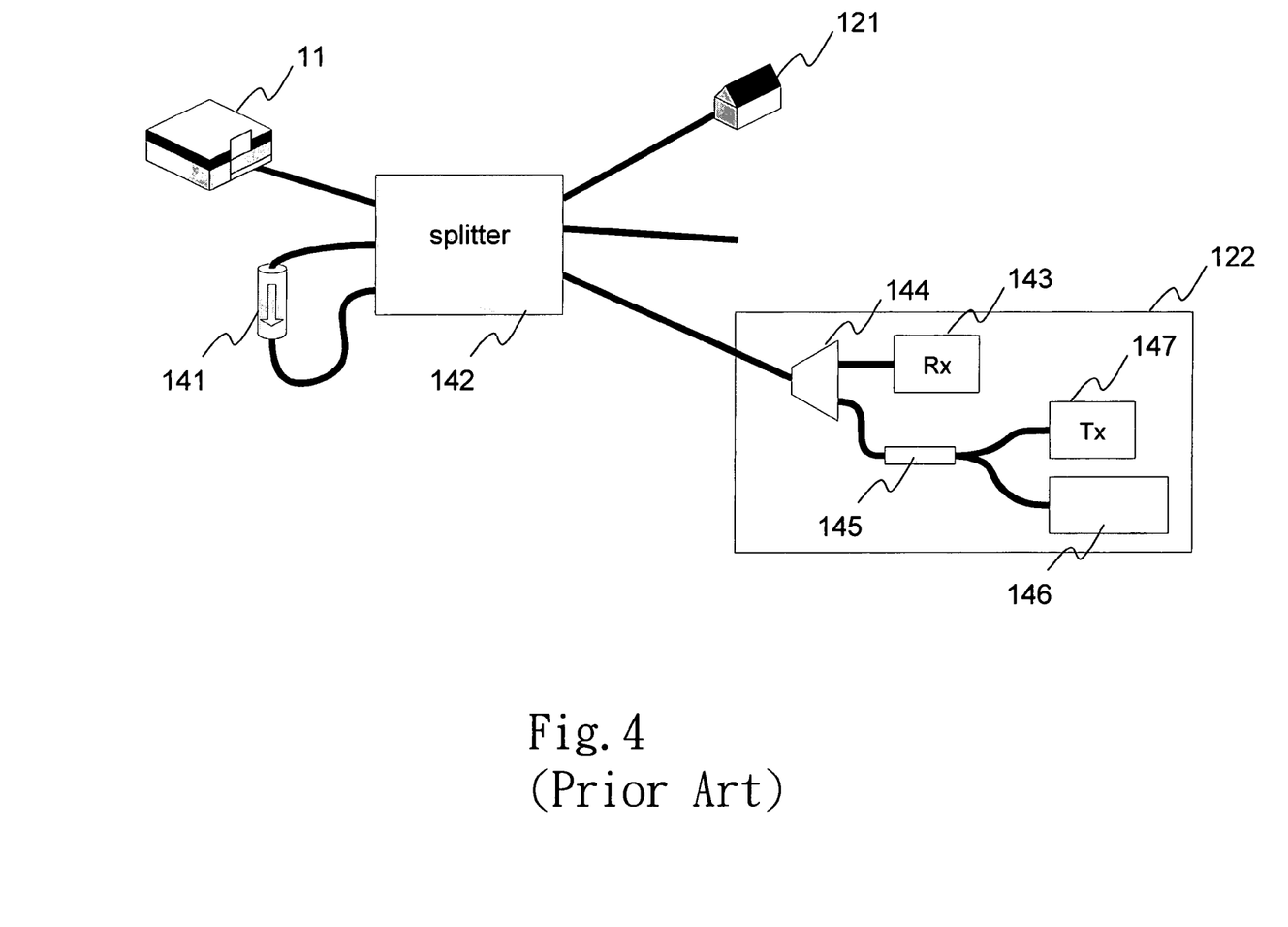
FIG. 4 is a schematic view of a conventional structure for detecting collisions.

On the other hand, since the optical ring 10 only provides a single ONU 12 to transmit data at a time, collisions will happen when other ONU 12 are using the optical ring 10 to transmit data or perform authorization at the same time. Consequently, one needs to make collision detection beforehand to reduce collisions. With reference to FIG. 4, a 3×N optical splitter 142 connects two of the three ports on the left-hand side (LHS) using an isolator 141. When light sends data from the first ONU 121 at the port on the right-hand side (RHS) to the optical splitter 142, the connected ports on the LHS reflect the signal because of the isolator 141. The reflected signal passes through the optical splitter 142 and reaches the second ONU 122. The second ONU 122 has a wavelength division multiplexing (WDM) system 144, an optical receiving unit 142, a coupler 145, an optical transmitting unit 147, and a carrier sensor 146. The carrier sensor 146 receives the returned signal. The advantage of this method is to avoid collisions as a result of sending several signals at the same time the first ONU 121 transmits data. However, one has to include in addition a 3×N optical splitter 142 and an isolator 141. This does not only increase the cost but also makes the system structure more complicated.

SUMMARY OF THE INVENTION

In view of the foregoing, the invention provides an Ethernet passive optical network ring and its method of authorization and collision detection. It can prevent the whole system from breaking when the network ring fails without the need of any new type of active or passive optical devices. With this structure, the invention can more effectively verify log-in users and prevent hackers from invading the system. With any additional devices, the invention can provide collision detection to reduce chances of network collisions.

According to the disclosed network ring and its authorization and collision detection method, the structure contains an optical ring, an optical line termination (OLT), several optical network units (ONU), and corresponding three-port passive optical splitting modules. The three-port passive optical splitting modules are installed at the intersections of the ONU and the optical ring. Each of the three-port passive optical splitting modules contains three optical ports, which are connected via three two-way passages so that the ONU can transmit/receive data via the two ends of the optical ring to/from the OLT. Therefore, even if the network ring breaks, the downstream ONU can still transmit/receive data using the other end.

Using the disclosed structure, one can determine the location of a user from the difference between the two times a signal is transmitted from an ONU to the two ends of the OLT, thereby verifying the user's identity. Since the invention uses the three-port passive optical splitting modules, any ONU can simultaneously transmit/receive data while another one is using the network. This can be used to detect collisions and to reduce collisions.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

In view of the drawbacks in the conventional Ethernet passive optical network ring, the invention uses a two-way transmission structure to guarantee that the downstream network still has a connection with the optical line termination (OLT) 11 even if the network has a failure. Moreover, it avoids the use of the switching method introduced in the prior art. The invention can directly perform two-way transmissions without the introduction of any new type of active or passive optical devices.

Figure 5:
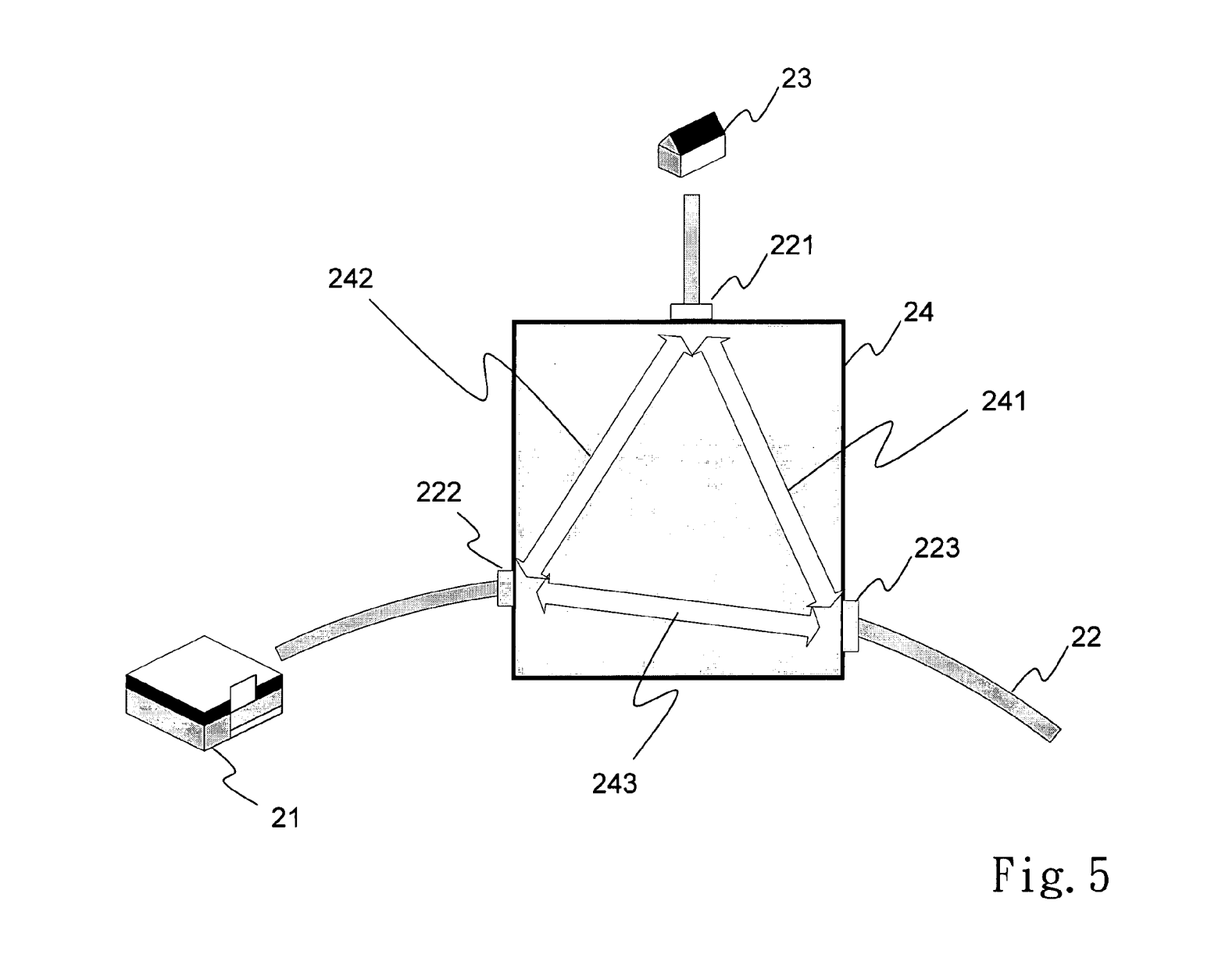
FIG. 5 is a schematic view of the disclosed optical splitter.

As shown in FIG. 5, the invention mainly utilizes a three-port passive optical splitting module 24 at the intersection of an optical network unit (ONU) 23 and the optical ring 22. The three-port passive optical splitting module 24 has three ports (the first port 221, the second port 222, and the third port 223 shown in the drawing) to connect the ONU 23 and the optical ring 22. The three-port passive optical splitting module 24 uses three passages (the first passage 241, the second passage 242, and the third passage 243 in the drawing) to connect the first port 221, the second port 222, and the third port 223, respectively. Therefore, the three ports can pass data back and forth simultaneously. If the network ring breaks, the downstream ONU 23 can still transmit data via the other end (to be described later).

Figure 6A:
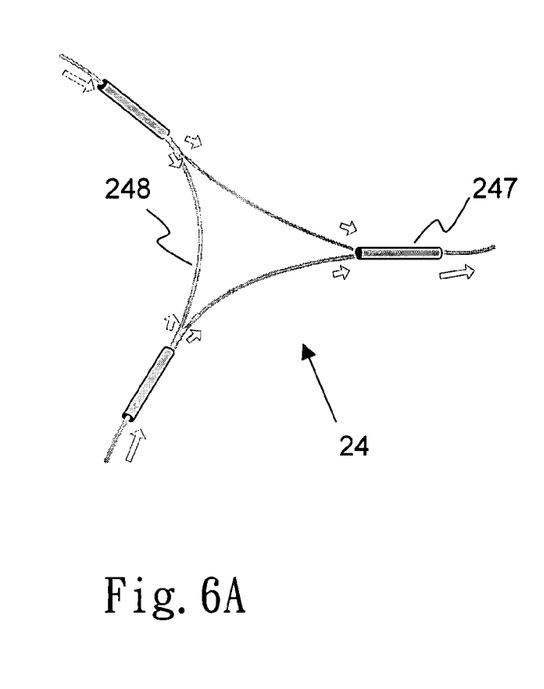
FIGS. 6A and 6B show an embodiment of the disclosed optical splitter.
Figure 6B:
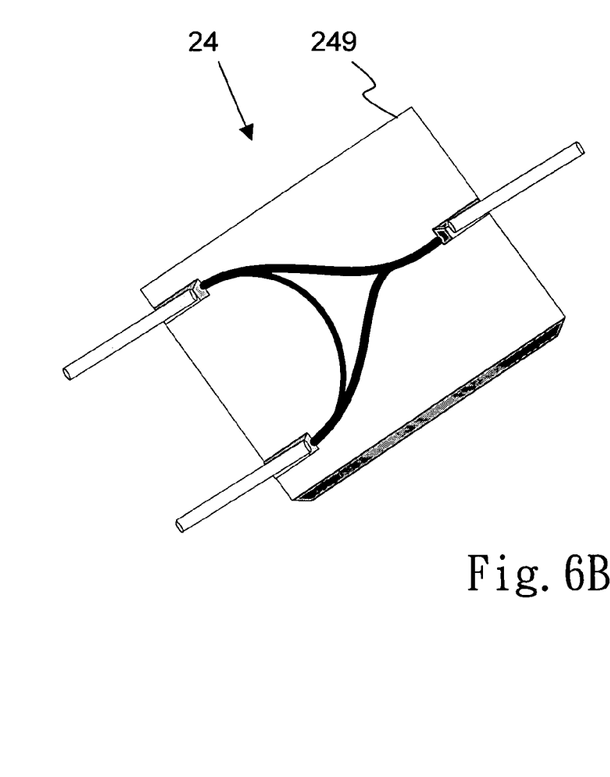

An embodiment of the three-port passive optical splitting module 24 is shown in FIG. 6A. Three optical splitters 247 along with three sub-fibers 248 are employed to achieve three two-way passages. On the other hand, one can also directly use a plane-wave waveguide 249 to achieve the same goal, as shown in FIG. 6B. Of course, these are only examples of the invention; people skilled in the art can make any other variations without departing from the spirit of the invention.

Figure 7:
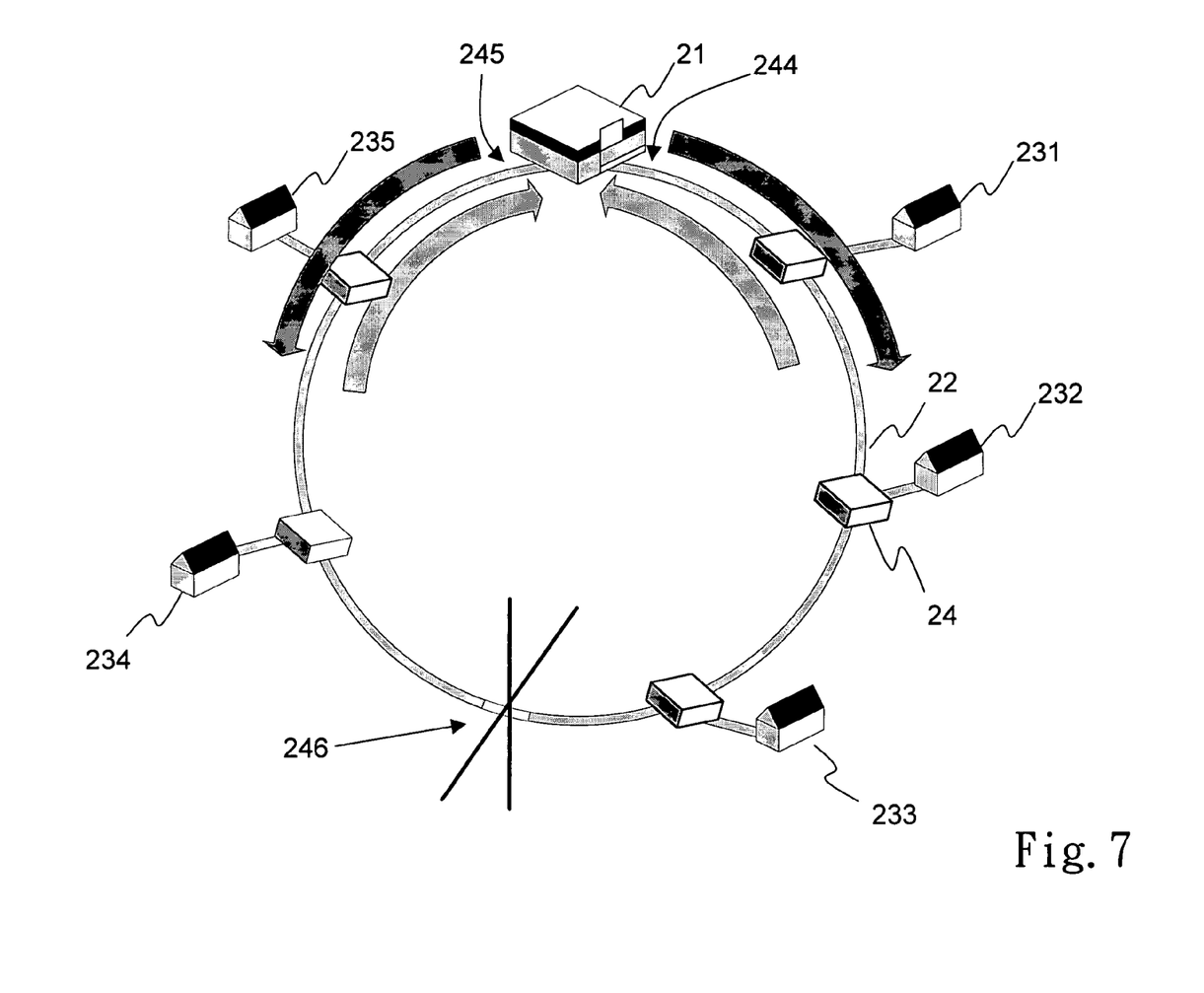
FIG. 7 is a schematic view of the protecting state of the disclosed Ethernet passive optical network ring.

We use an example to explain the invention. With reference to FIG. 7, the Ethernet passive optical network ring contains an OLT 21, an optical ring 22, several ONU (the first ONU 231, the second ONU 232, the third ONU 233, the fourth ONU 234, and the fifth ONU 235 shown in the drawing), and corresponding three-port passive optical splitting modules 24. The optical ring has a first end 244 and a second end 245 connecting to both ends of the OLT 21 to form a closed ring. The optical ring 22 is also coupled with the first ONU 231, the second ONU 232, the third ONU 233, the fourth ONU 234, and the fifth ONU 235, thus defining five intersections. The associated three-port passive optical splitting modules are installed at these intersections, providing two-way transmissions. In other words, the system can transmit/receive data via the first end 244 and the second end 245 (in the clockwise and counterclockwise directions following the arrows shown in the drawing).

Suppose the optical ring 22 breaks (i.e. when there is a breaking point 246 on the ring) between the third ONU 233 and the fourth ONU 234 as shown in the drawing. The first ONU 231, the second ONU 232, and the third ONU 233 can still use the first end 244 of the optical ring 22 to receive data in the clockwise direction and to transmit data in the counterclockwise direction. The fourth ONU 234 and the fifth ONU 235 use the second end 245 of the optical ring 22 to receive data in the counterclockwise direction and to transmit data in the clockwise direction.

Figure 8:
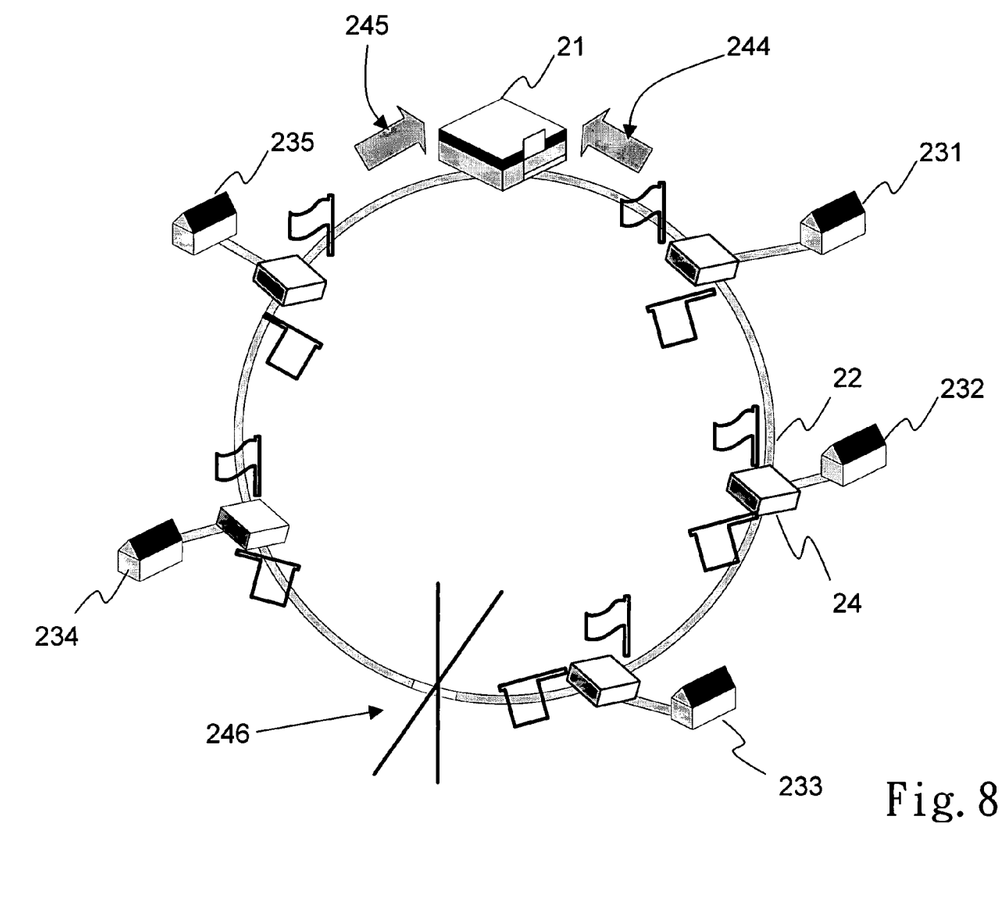
FIG. 8 is a schematic view of the breaking point detection state of the disclosed Ethernet passive optical network ring.

As shown in FIG. 8, one can also determine the location of the breaking point 246 according to the data transmission directions. In the current example, the signals received by the OLT 21 via the first end 244 are only from the first, second, and third ONU 231, 232, 233, while those received by the OLT 21 via the second end 245 are only from the fourth and fifth ONU 234, 235. Therefore, the breaking point 246 is seen to be between the third and fourth ONU 233, 234. One can also use the design of lights as shown in Table 1 to identify the breaking point 246 more easily.

TABLE 1

|     | 231 | 232 | 233 | 234 | 235 |
|-----|-----|-----|-----|-----|-----|
| 244 | □   | □   | □   | ■   | ■   |
| 245 | ■   | ■   | ■   | □   | □   |
|     |     |     | ↑246 |     |     |

Figure 9:
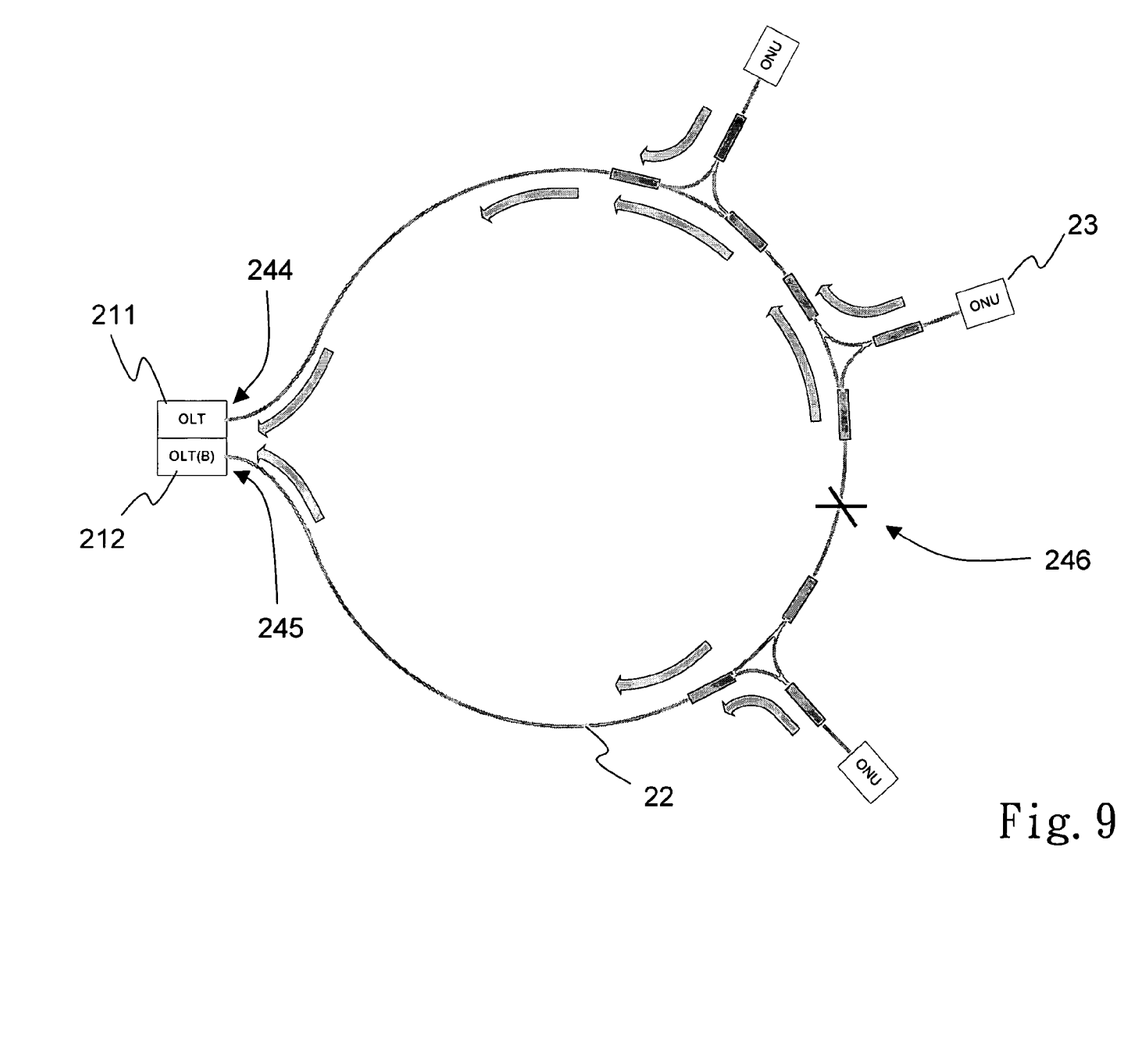
FIG. 9 is a schematic view of the disclosed OLT.

To facilitate controls, the OLT 21 can be designed to contain a main server 211 and a backup server 212 connecting to the first end 244 and the second end 245 of the optical ring 22, respectively (see FIG. 9). Normally, the backup server 212 also receives signals and data but does nothing with them. All the processes are done by the main server 211. The backup server 212 starts processing only when there is a breaking point 246.

Figure 10:
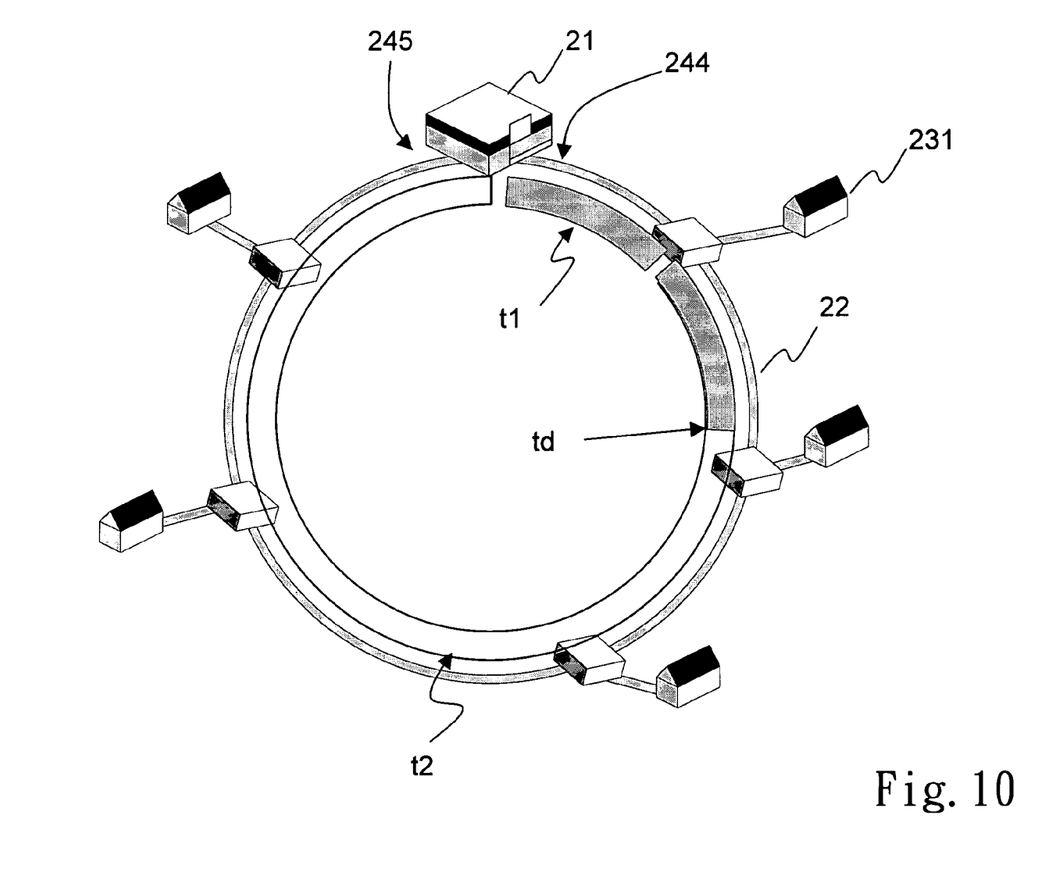
FIG. 10 is a schematic view of user authorization according to the invention.

Since the disclosed structure supports two-way transmissions, the system can be used to develop an authorization method for different users. As shown in FIG. 10, when the user at the first ONU 231 logs into the system, the OLT 21 receives the signal from both the first end 244 and the second end 245. One can use the receiving times (t1 and t2) to compute the difference $td=|t2-t1|$. The difference td is used to verify the user's identity. t1 and t2 have another relation that their sum is the time it takes a signal to travel around the optical ring 22. One thus gets the round-trip signal traveling time is twice t1 plus td (assuming t1 is smaller). This relation thus can be used to help verifying the user, preventing hackers from forging signal transmission time. Of course, the difference td can be used to first locate the user before authorization. For convenience, the difference td of each ONU 23 can be recorded so that, in the future, the system only needs to compare the user data with the corresponding difference td.

Figure 11:
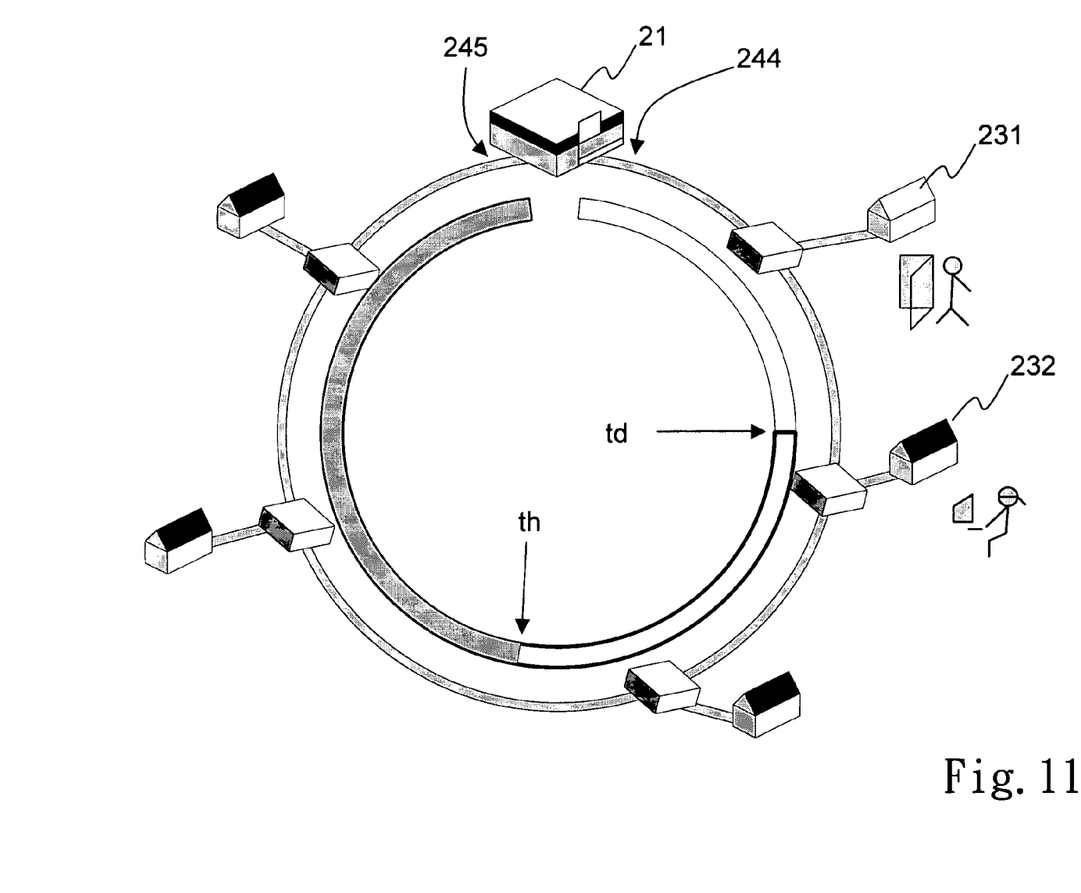
FIG. 11 is a schematic view showing how the invention prevent hackers from invading the system.

In the following, we use an example to explain the invention. With reference to FIG. 11, suppose the user logs in via the first ONU 231, gets authorized, and temporarily leaves the position. If a hacker uses the user's identity to enter the network from the second ONU 232, the difference th is obviously different from the difference td of the first ONU 231. Therefore, the OLT 21 determines it as an illegal invasion. Even if the identity data are entered correctly, the network can still catch the hacker.

Figure 12:
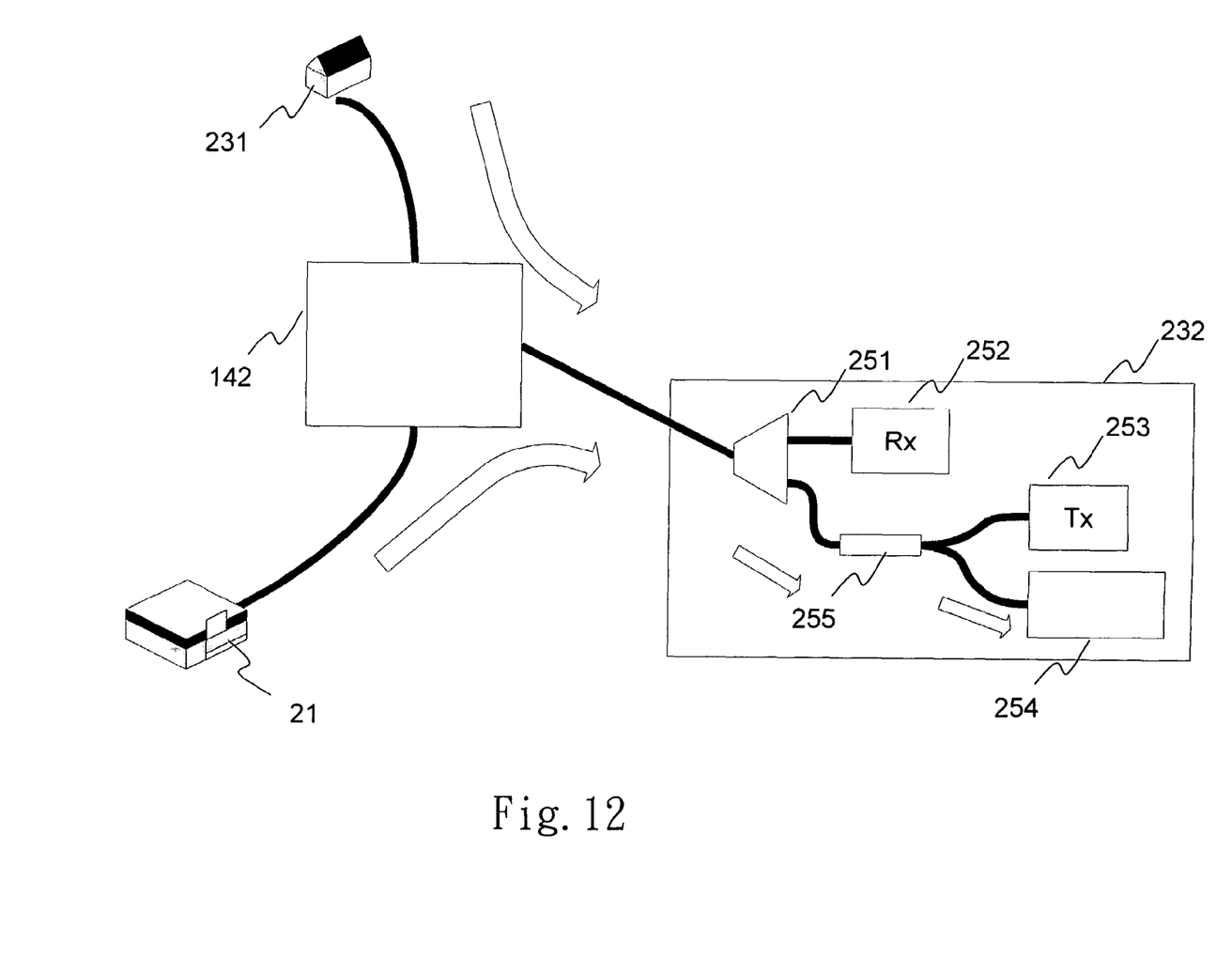
FIG. 12 is a schematic view of the collision detection state according to the invention.

As shown in FIG. 12, the invention utilizes the three-port passive optical splitting module 142 to perform simultaneous two-way transmissions. Thus, the information sent from the first ONU 231 enters the second ONU 232 too. The second ONU 232 has its WDM system 251 to transmit the information to its coupler 255, but not the optical receiving unit 252 (this is because the wavelength of the transmitted and received signal is different). The coupler 255 passes the signal to the carrier sensor 254, which uses a threshold for determination. If it is over the threshold, it means that other users are transmitting data too and therefore the second ONU 232 is not allowed to transmit data. Moreover, the carrier sensor 254 can contain a low-pass filter and a threshold sensor for a more precise determination. The low-pass filter first checks the received signal, and the threshold sensor makes the decision. Since collisions mostly happen when various users log in at the same time, therefore, the disclosed mechanism can effectively prevent collisions from occurring.

Certain variations would be apparent to those skilled in the art, which variations are considered within the spirit and scope of the claimed invention.

What is claimed is:

1. An Ethernet passive optical network (EPON) ring comprising:
   an optical ring with a first end and a second end;
   an optical line termination (OLT), which is coupled to the first end and the second end of the optical ring;
   a plurality of optical network units (ONU), each of which is connected to the optical ring between the first end and the second end, thus defining a plurality of intersections on the optical ring;
   a plurality of three-port passive optical splitting modules, each of which is installed at one of the intersections and contains three optical ports;
   wherein the three optical ports in each three-port passive optical splitting module are connected using three two-way passages to allow the ONU to transmit/receive data via the first end and the second end of the optical ring to/from the OLT;
   a wavelength division multiplexing (WDM) system, which has a double-port end and a single-port end and couples to the three-port passive optical splitting module via the single-port end;
   an optical receiving unit, which connects to the double-port end of the WDM system for receiving signals from the OLT;
   a coupler, which connects to the double-port end of the WDM system for receiving signals transmitted by the other ONU;
   an optical transmitting unit, which connects to the coupler for transmitting signals to the optical ring; and
   a carrier sensor, which connects to the coupler for receiving signals sent by other ONU, thereby controlling the timing for the optical transmitting unit to send signals to the optical ring.

2. The EPON ring of claim 1, wherein each of the three-port passive optical splitting modules contains three sub-fibers and three optical splitters so that the optical splitters provide the three optical ports and the three sub-fibers couple to the three optical splitters to form the passages.

3. The EPON ring of claim 1, wherein each of the three-port passive optical splitting modules is a plane-wave waveguide.

4. The EPON ring of claim 1, wherein the OLT contains a main server and a backup server connecting to each other, the main server connecting to the first end of the optical ring and the backup server connecting to the second end of the optical ring.

5. The EPON ring of claim 4, wherein the backup server only backs up data in its normal state and uses the backup data for rescue purposes when the optical network breaks.

6. The EPON ring of claim 5, wherein when there is a breaking point on the optical ring the backup server enables the downstream ONU to transmit/receive data.

7. The EPON ring of claim 1, wherein when there is a breaking point on the optical ring the OLT determines the location of the breaking point according to the data of the ONU received via the first end and the second end.

8. The EPON ring of claim 1, wherein the carrier sensor contains a low-pass filter and a threshold sensor so that the low-pass filter checks signals transmitted by other ONU for the threshold sensor to make decisions.

9. An authorization method for an Ethernet passive optical network (EPON) ring with an optical ring, an OLT connected between the two ends of the optical ring, and a plurality of ONU that use a plurality of three-port passive optical splitting modules to connect to the optical ring, so that each ONU receives/transmits data via the two ends of the optical ring from/to the OLT through the connection of three two-way passages inside the three-port passive optical splitting modules, the method verifying a user who uses an ONU to enter the optical network and comprising the steps of:
   receiving a signal sent from the ONU of the user via the two ends of the optical ring;
   obtaining the two times of receiving the signal via the two ends;
   computing a difference of the two times; and
   using the time difference to verify the user's identity.

10. The method of claim 9, wherein the signal is a signal that the user logs into the optical network.

11. The method of claim 9, wherein the step of using the time difference to verify the user's identity comprises the steps of:
    using the time difference to find out the location of the ONU of the user on the optical ring; and
    using the location of the ONU of the user and the signal to verify the user's identity.

12. The method of claim 9, wherein the user's identity is obtained by comparing the time difference with a user identity table.

13. The method of claim 12, wherein the user identity table is a list of all users and their corresponding time differences.

14. A collision detection method for an Ethernet passive optical network (EPON) ring with an optical ring, an OLT connected between the two ends of the optical ring, and a plurality of ONU that use a plurality of three-port passive optical splitting modules to connect to the optical ring, so that each ONU receives/transmits data via the two ends of the optical ring from/to the OLT through the connection of three two-way passages inside the three-port passive optical splitting modules, the method verifying there is no more than one ONU transmitting data at a time on the optical ring to reduce chances of collisions and comprising the steps of:
    receiving a signal transmitted by the optical ring using the three-port passive optical splitting module;
    filtering the signal;
    verifying that the signal is transmitted by other ONU; and
    forbidding the ONU from transmitting the signal.

15. The method of claim 14, wherein the signal is a signal that other ONU has a login activity.

16. The method of claim 14, wherein the step of filtering the signal is followed by the step of using a threshold to determine the signal.

17. The method of claim 16, wherein the threshold uses the wavelength of the signal for determination.

18. The method of claim 14, wherein the ONU is controlled to send the signal if no other ONU is transmitting any signal in the step of verifying that the signal is transmitted by other ONU.

* * * * *